(12) United States Patent
Shahid (10) Patent No.: US 6,259,856 B1
(45) Date of Patent: *Jul. 10, 2001

(54) SMALL FORM FACTOR MULTI-FIBER OPTICAL CONNECTORS AND METHODS FOR MAKING SAME

(75) Inventor: Muhammed A. Shahid, Snellville, GA (US)

(73) Assignee: Lucent Technologies, Inc., Murry Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/276,285

(22) Filed: Mar. 25, 1999

Related U.S. Application Data

(63) Continuation-in-part of application No. 09/262,112, filed on Mar. 4, 1999.

(51) Int. Cl.$^7$ ................................. G02B 6/00; G02B 6/36
(52) U.S. Cl. ................................ 385/147; 385/78; 385/83
(58) Field of Search ............................... 385/76, 78, 83, 385/86, 147

(56) References Cited

U.S. PATENT DOCUMENTS

| 4,973,127 | 11/1990 | Cannon, Jr. et al. | 350/96.22 |
|---|---|---|---|
| 5,214,730 | 5/1993 | Nagasawa et al. | 385/59 |
| 5,287,426 | 2/1994 | Shahid | 385/85 |
| 5,325,455 | * 6/1994 | Henson et al. | 385/89 |
| 5,388,174 | 2/1995 | Roll et al. | 385/80 |
| 5,396,572 | 3/1995 | Bradley et al. | 385/78 |
| 5,481,634 | 1/1996 | Anderson et al. | 385/76 |
| 5,603,870 | 2/1997 | Roll et al. | 264/1.25 |
| 5,613,024 | 3/1997 | Shahid | 385/52 |
| 5,620,634 | 4/1997 | Shahid | 264/1.25 |
| 5,666,456 | 9/1997 | Merriken | 385/134 |
| 5,689,599 | 11/1997 | Shahid | 385/83 |
| 5,768,455 | 6/1998 | Konik | 385/86 |
| 5,901,262 | * 5/1999 | Kobayashi et al. | 385/89 |
| 6,095,695 | * 8/2000 | Ohtsuka et al. | 385/72 |

FOREIGN PATENT DOCUMENTS 0 490 698 A1   6/1992 (EP).

OTHER PUBLICATIONS

Roger E. Weiss, Multifiber–ferrule ribbon cable connector shrinks installation costs, Oct. 1996 edition of *Lightwave*, Copyright 1996 by PennWell Publishing Company.

* cited by examiner

*Primary Examiner*—Frank G. Font
*Assistant Examiner*—Michael P. Stafira
(74) *Attorney, Agent, or Firm*—Alston & Bird LLP (57) ABSTRACT

A small form factor, multi-fiber connector having the footprint of a LC connector for high density applications is disclosed. A multi-fiber ferrule, which may or may not be stacked, is received in the front end of the housing. A spring member is disposed within the housing for axially urging the multi-fiber ferrule outwardly to maintain the end face of the ferrule flush with the device to which it is coupled. The housing includes an end cap which snaps into the housing body and holds the spring member. Thus, a multi-fiber stackable connector in accordance with the present invention is relatively simple in construction and assembly, inexpensive, and user friendly.

22 Claims, 5 Drawing Sheets

SMALL FORM FACTOR MULTI-FIBER OPTICAL CONNECTORS AND METHODS FOR MAKING SAME

CROSS REFERENCE TO RELATED APPLICATIONS

This is a continuation-in-part of co-pending application Ser. No. 09/262,112, filed Mar. 4, 1999, and entitled "Stackable Multi-Fiber Ferrule Assembly Methods and Tools."

FIELD OF THE INVENTION

The present invention generally relates to optical fiber connectors, more particularly, to small form factor connectors for high density applications.

BACKGROUND OF THE INVENTION

Advances in lightwave technology have made optical fiber a very popular medium for large bandwidth applications. In particular, optical technology is being utilized more and more in broadband systems wherein communications between systems take place on high-speed optical channels. As this trend continues to gain more and more momentum, the need for efficient utilization of the precious real estate on circuit boards, racks/shelves, back planes, distribution cabinets, etc., is becoming ever increasingly important. In order to fulfill expectations across the industry, opto-electronic modules and optic fiber devices need to continue to become miniaturized, thereby taking full advantage of the maturity of micro- and opto-electronic technologies for generating, transporting, managing and delivering broadband services to the ever increasing bandwidth demands of end users at increasingly lower costs. Thus, the industry has placed an emphasis on small form factor optical connectors, such as the LC connector from Lucent Technologies, Inc. However, miniaturization is tempered by the requirements of transmission efficiency. For instance, with the advent of new standards such as gigabit Ethernet, wherein the transmission efficiency is becoming more and more critical, the performance of optical connectors is becoming correspondingly important for healthy operation of the system. Thus, it is desirable to obtain component miniaturization without sacrificing transmission efficiency, and preferably while improving transmission efficiency.

With the miniaturization of optical modules and optical fiber devices, the management of optical fiber congestion has become an issue at optical interfaces and connection distribution points. One solution is the use of multi-fiber ribbon in which a plurality of optical fibers are organized and molded side by side in a plastic ribbon. It is known to interconnect these ribbon cables by supporting the fibers between two support members made of a monocrystalline material, such as silicon. In the support members are V-grooves formed utilizing photolithographic masking and etching techniques. The fibers are placed side by side in individual V-grooves of one support member and the other mating support member having corresponding V-grooves is placed over the fibers so as to bind or hold the fibers in a high precision, spatial relationship between the mating V-grooves. The top and bottom support members sandwiching the multi-fiber ribbon are typically bonded together with a clamp or adhesive, forming a ferrule of a multi-fiber connector. Two mating ferrules with the same fiber spacing may then be placed in an abutting relationship so that the ends of the fibers of the respective ferrules are substantially co-axially aligned with one another, thereby forming a multi-fiber connection. If desired, such ferrules can be stacked in order to increase the interconnection density.

Multi-fiber ribbons and connectors have numerous applications in optic communication systems. For instance, some opto-electronic and optical application specific integrated circuits (OASIC) devices, e.g, optical switches, optical power splitters/combiners, routers, etc., have several input and/or output ports arranged as linear arrays to which a plurality of fibers are to be coupled. Further, since optical fibers are attached to launch optical signals into these devices and extract optical signals out of these devices, splicing of arrays of fibers (i.e., a multi-fiber ribbon) to such devices can be achieved using mutifiber connectors. Yet another possible application relates to an optical fan-out fabric where an array of fibers in a multi-fiber ribbon may be broken into simplex or duplex channels for distribution purposes, as is often desired.

A critical factor to the optical efficiency of a multi-fiber connector, whether or not stacked, is the precise alignment of the mating ferrules with regard to one another. As the ferrule structures utilized to achieve the precise axial alignment of corresponding optical fibers of a multi-fiber connection become smaller, there exist a need for connectors that are likewise space efficient so that full advantage of the miniaturized ferrule can be realized with higher interconnection density. Further, there also exist the need for multi-fiber connectors to be user friendly so that the operation and utility of the multi-fiber connector is intuitive to the workers that will be installing systems utilizing optical components. For example, it is desirable for multi-fiber connectors to have plug-and-play capability, in that they can be quickly and easily coupled to a piece of equipment, device, or one another.

In summary, there continues to exist a need for miniaturized multi-fiber connectors in order to take advantage of the more space efficient optical ferrules while, at the same time, increasing the functionality and ease of use of such multi-fiber connectors.

SUMMARY OF THE INVENTION

The present invention is a small form factor, multi-fiber connector having the footprint (cross-section dimension) of a LC connector for high density applications. A multi-fiber ferrule, which may or may not be stacked, is received in the front end of the housing. Optionally, a spring member is disposed within the housing for axially urging the multi-fiber ferrule outwardly. This assists in maintaining the end face of the ferrule flush with the device to which it is coupled. The housing includes an end cap which snaps into the housing body and holds the spring member. Thus, a multi-fiber stackable connector in accordance with the present invention is relatively simple in construction and assembly, inexpensive, and user friendly.

In accordance with an aspect of the present invention, a multi-fiber optical connector comprises a multi-fiber ferrule that terminates a plurality of optical fibers, and a housing having a first end, a second end, and an axial passageway extending from the first end to the second end, wherein the housing receives the multi-fiber ferrule in the first end thereof. The multi-fiber connector further comprises a spring member disposed in the passageway and interacting with the multi-fiber ferrule to axially urge the multi-fiber ferrule outwardly. The housing may include an end cap coupled to the second end thereof, and which interacts with and holds the spring member opposite the multi-fiber ferrule.

The multi-fiber ferrule may terminate a single linear array of optical fibers, or alternatively, stacked arrays of optical fibers. If the multi-fiber ferrule terminates stacked arrays of optical fibers, then the stacked arrays of optical fibers can be configured so that the lateral spacing between adjacent optical fibers is an integer multiple of the vertical spacing between corresponding optical fibers. The optical fiber spacing is preferably approximately 250 microns, or less.

The housing may define opposing slots, wherein the multi-fiber ferrule at least partially extends through the slots. In addition, the housing may comprise a spring latch extending from the housing.

The connector may further comprise an adapter having a first end that receives the housing and a second end that includes an aperture through which an end face of the multi-fiber ferrule protrudes. The adapter may be coupled to another adapter for facilitating the connection of two or more fibers, or the adapter may be coupled to an optical device such as a transceiver.

In accordance with another aspect of the present invention, a method for fabricating a multi-fiber optical connector comprises the steps of providing an elongated housing having a first end, a second end, and an axial passageway extending from the first end to the second end, placing a spring member in the axial passageway adjacent to the second end, and placing a multi-fiber ferrule in the first end of the plug housing so that the spring member axially urges the multi-fiber ferrule outwardly from the housing. The method may further comprise the step of providing an adapter having a first end that receives the elongated housing and a second end that includes an aperture through which an end face of the multi-fiber ferrule protrudes.

The step of providing the elongated housing may include the step of providing an elongated housing with a spring latch extending therefrom. The step of providing the elongated housing may include the step of coupling an end cap to the second end of the elongated housing. In addition, the step of providing the elongated housing may include the step of providing an elongated housing that defines opposing lateral slots, wherein the step of placing the multi-fiber ferrule includes the step of placing the multi-fiber ferrule in the first end of the elongated housing so that the multi-fiber ferrule at least partially extends through the slots.

In accordance with yet another aspect of the present invention, a small form factor multi-fiber optical connector for high density applications comprises an elongated housing having a first end, a second end, and axial passageway therethrough, and a multi-fiber ferrule received in the first end of the elongated housing. The multi-fiber optical connector further comprises an end cap coupled to the second end of the elongated housing, a loading mechanism disposed within the passageway between the multi-fiber ferrule and the end cap for axially urging the multi-fiber ferrule outwardly, and a latch mechanism coupled to the elongated housing.

The elongated housing may define slots in opposing sides thereof, wherein the multi-fiber ferrule extends at least partially through the slots. In addition, the multi-fiber ferrule may terminate stacked arrays of optical fibers. If the multi-fiber ferrule terminates stacked arrays of optical fibers, then the stacked arrays of optical fibers may be configured so that the vertical spacing between adjacent optical fibers is an integer multiple of the lateral spacing between corresponding optical fibers. Preferably, the spacing of the optical fiber in an array of the ferrules is approximately 250 microns, or less. The connector may further comprise an optical adapter having a first end that receives the elongated housing and a second end that includes an aperture through which an end face of the multi-fiber ferrule protrudes. On the other side of the optical interface, there could be a similar connector or a 1D (one dimensional) or 2D (two dimensional) array optical transmitter, receiver or other devices.

Other features and advantages of the present invention will become apparent to one skilled in the art upon examination of the following drawings and detailed description. It is intended that all such features and advantages be included herein within the scope of the present invention as defined by the appended claims.

BRIEF DESCRIPTION OF THE DRAWINGS

FIGS. 6A–6D are perspective views of an alternative embodiment of a multi-fiber connector in accordance with the present invention. FIGS. 6B and 6C are shown in cross-section for clarity.

DETAILED DESCRIPTION OF THE INVENTION

The present invention will now be described more fully hereinafter with reference to the accompanied drawings, which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like reference numeral refer to like elements throughout. Furthermore, the elements of the drawings are not necessarily to scale, emphasis instead being placed upon illustrating the principles of the present invention.

The present invention comprises a small form factor, multi-fiber connector that has particularly advantageous application in high density interconnection systems. The relatively small footprint of a connector in accordance with the present invention is relatively easy to fabricate and assemble, and is more space efficient than prior connector designs. Accordingly, the following disclosure initially describes exemplary multi-fiber ferrule designs suitable for use with the multi-fiber connector of the present invention, followed by a disclosure of preferred and alternative embodiments of multi-fiber connectors in accordance with the present invention. It should be noted that the present invention is not to be limited to the multi-fiber ferrule and connector designs disclosed herein, and one of ordinary skill in the art will recognize that the multi-fiber connector of the present invention may be compatible with any number of ferrule designs or configurations, including optical interfaces of optoelectronic modules such as VCSEL based 1D and 2D transmitter array modules, compatible receiver modules, or other devices.

Multi-Fiber Ferrule Designs

Figure 1:
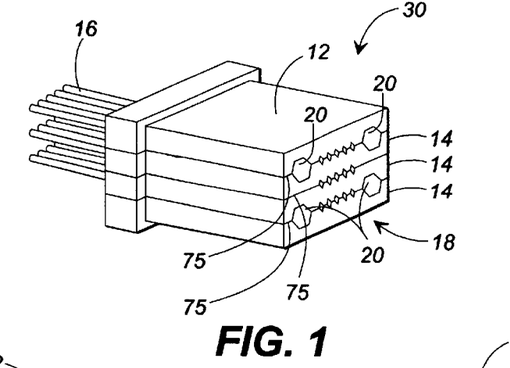
FIG. 1 is a perspective view of a multi-fiber stackable ferrule.

With reference to FIG. 1, a multi-fiber stackable ferrule 10 is illustrated. The ferrule 10 comprises two outer support members 12 that sandwich substantially identical inner support members 14. For illustrative purposes, the embodiment chosen terminates three multi-fiber ribbons 16, wherein each ribbon includes five optical fibers, though upon reading the disclosure herein, it will be apparent to one of ordinary skill in the art that the disclosed ferrule design may be utilized to terminate any number of multi-fiber ribbons 16 and/or any number of optical fibers per ribbon. For example, the multi-fiber ferrule illustrated in FIGS. 4A, 4B, 5A, and 5B terminates a single multi-fiber ribbon of two optical fibers, wherein the spacing of the optical fiber terminations at the end face of the ferrule may be in accordance with an optical fiber connector interface standard.

The support members 12, 14 include parallel V-grooves which hold the fibers of the respective multi-fiber ribbons 16 in precise, spaced alignment with respect to one another as the V-grooves of adjacent support members are laid over one another in a mating relationship. Thus, the individual fibers of the multi-fiber ribbons 16 are substantially flush to the front end face 18 of ferrule 10 so that the fibers may be optically coupled to another ferrule or device, such as optical transmitter and receiver modules.

Alignment pin holes 20 are formed by alignment pin grooves in the support members 12, 14, and are provided for on every other row of optical fibers, that is, at alternate interfaces of the respective adjacent support members. In particular, the alignment pin grooves of the inner support members 14 are not opposing one another on opposite sides of the inner support member. As illustrated, the alignment pin grooves are provided in only one surface, though it will be appreciated by those of ordinary skill in the art that alternative designs may be utilized, such as where the alignment pin grooves are diagonal to one another on opposite surfaces. Thus, the inner support members 14 do not have to be thick enough to accommodate two opposing alignment pin grooves, and therefore, can be made thinner than conventional inner support members. Accordingly, the overall height or thickness of the ferrule 10 may be advantageously reduced, and the overall interconnection density increased.

Figure 2A:
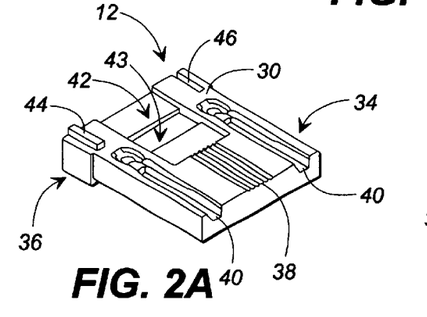
FIG. 2A is a top perspective view of an outer support member.
Figure 2B:
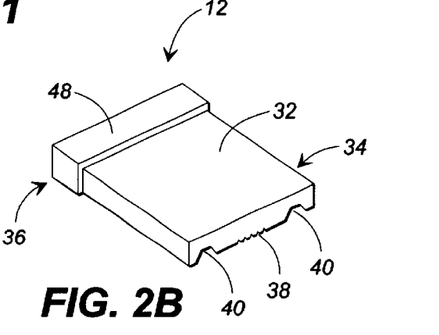
FIG. 2B is a bottom perspective view of the outer support member of FIG. 2A.

With reference to FIGS. 2A and 2B, the inside surface 30 and outside surface 32 of the outer support member 12 are illustrated, respectively. The outer support member 12 includes a front portion 34 and a rear portion 36. An array of parallel V-grooves 38 for receiving and holding the optical fibers of the multi-fiber ribbon 16 in precise alignment with respect to one another are provided in the front portion 34 of the inside surface 30. In addition, the inside surface 30 includes relatively deeper V-grooves, referred to hereinafter as alignment pin V-grooves 40, which are laterally disposed on either side of V-grooves 38 and are sized and shaped for holding alignment pins. While the alignment pin V-grooves 40 extend from the front portion 34 toward the rear portion 36, it is recognized that the V-grooves 40 may be sized to extend from the front portion 34 to the rear portion 36, essentially extending from one edge to an opposite edge of the inside surface 30. The lateral space between the V-grooves 38, 40 may be defined in accordance with an optical fiber connector interface standard, if desired. Further, while five V-grooves 38 are provided by outer support member 12, it will be appreciated by those of ordinary skill in the art that more or fewer than five may be utilized, though the maximum number may be limited by the physical size of the connector footprint. For example, it has been determined that as many as six optical fibers in a linear array may be terminated in a multi-fiber ferrule that can be utilized with a connector in accordance with the present invention having a LC footprint, which is approximately 4.6 by 4.6 millimeters (mm). Since the footprint of the LC connector is essentially square, the linear array of optical fiber of a single multi-fiber ribbon may be horizontally aligned (as in FIG. 4A and 4B) or vertically aligned (not shown) within a connector, in accordance with the present invention.

The rear portion 36 includes a ribbon recess 42 which holds a multi-fiber ribbon 16 at or about the point at which the individual optical fibers of the ribbon are separated and stripped. The ribbon recess also provides space for the adhesive utilized to bond adjacent support members together, as discussed below. Further, ribbon recess 42 includes a strain relief element recess 43 for receiving and engaging a lip or other retaining structure at the end of an external strain relief element associated with the multi-fiber ribbon.

A retaining pin 44 and a retaining slot 46 are provided on either side of the cable recess 42 for proximately aligning and holding adjacent support members. The retaining pin 44 and slot 46 provide for the lateral alignment of adjacent support members so that corresponding arrays of V-grooves align with one another. The mating V-grooves can be fabricated with such precision, as discussed hereinafter, that the V-grooves themselves precisely align the individual fibers. This is inherent in the V-shaped design which has an acceptance region at the open end or top of each V-groove for receiving an individual optical fiber which is held in a precise predetermined alignment by the sides of the V-groove. The precise alignment of adjacent support members ensures that the mating V-grooves of adjacent support members are in registration with one another. A lip 48 at the rear portion 36 is provided to register an end-stop in a housing in which such ferrules are utilized, as well known in the art.

Figure 2C:
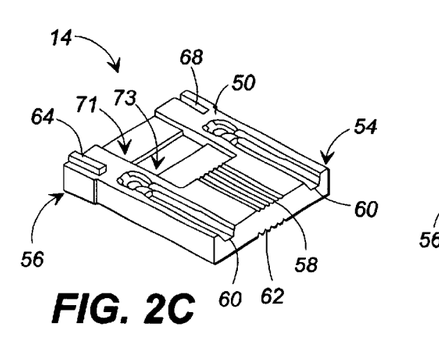
FIG. 2C is a top perspective view of an inner support member.
Figure 2D:
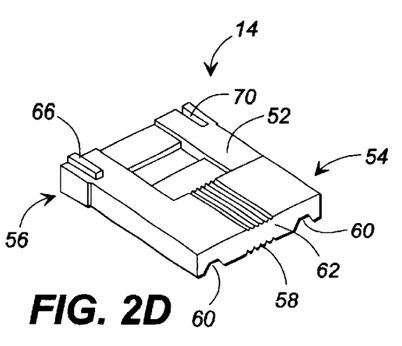
FIG. 2D is a bottom perspective view of the inner support member of FIG. 2C.

With reference to FIGS. 2C and 2D, opposing first and second surfaces 50, 52 of the inner support member 14 are illustrated. The inner support member 12 includes a front portion 54 and a rear portion 56. A first array of parallel V-grooves 58 are provided in a first surface 50 at the front portion 56 for receiving and holding optical fibers of the multi-fiber ribbon 16, and relatively deeper alignment pin grooves 60 laterally disposed on either side of the first array of V-grooves 58. In addition, the second surface 52 of the inner support member 14 includes a second array of parallel V-grooves 62. Thus, the inner support member 14 includes substantially identical and aligned arrays of V-grooves 58, 62 on opposite surfaces for mating with corresponding arrays of V-grooves formed in adjacent support members. In addition, retaining pins 64, 66 and retaining slots 68, 70 are provided on opposing surfaces 50, 52 at the rear portion 58 of the inner support member 14 for aligning and holding adjacent support members, as discussed above with respect to the outer support member 12. Yet further, a ribbon recess 71 and a strain relief element recess 73 are provided in both surfaces 50, 52, as also discussed above with respect to the outer support member 12.

As illustrated, the inner support member 14 does not include opposing alignment pin grooves in opposite surfaces. Specifically, with reference to the embodiment illustrated in FIGS. 2C and 2D, the second surface 52 does not include alignment pin V-grooves. It is noted, however, that the second surface may include alignment pin grooves which are staggered (i.e., offset) with respect to the corresponding alignment pin grooves 60 in the first surface 50 in the alternative. However, if staggered alignment pin grooves are utilized, then the lateral space on either side of the arrays of V-grooves may have to be increased, which may not be acceptable in certain applications. Thus, whether one surface does not include alignment pin grooves or the alignment pin grooves are staggered on opposite surfaces, the thickness of the inner support member may be less than that of conventional support members since the support member does not have to be thick enough to accommodate opposing alignment pin grooves. For example, with reference to FIG. 3, the thickness 72 of an inner support member is approximately 740 microns in the preferred embodiment, whereas conventional support members are often 2500 microns thick. Accordingly, by reducing the thickness of the inner support member, a stackable multi-fiber ferrule can be made small enough to be received within a smaller connector housing, thereby enabling the increase of interconnection density.

Figure 3:
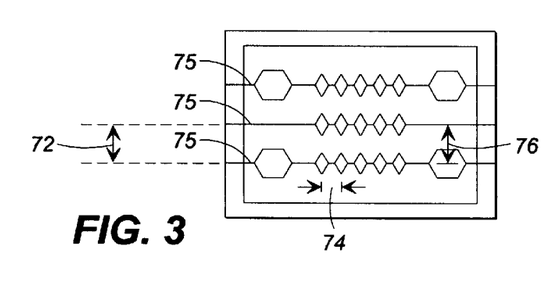
FIG. 3 is a front plan view of the multi-fiber stackable ferrule of FIG. 1.

In addition, it is preferred that the thickness 72 of the inner support members should be such that the distance 76 between the center of the V-grooves at one interface and the centers of the V-grooves at an adjacent interface is a whole number multiple of the distance 74 between the centers of adjacent V-grooves within an array, or vice versa. Accordingly, the thickness 72 is approximately 740 microns and the spacing at the interfaces 72 between adjacent support members is approximately 10 microns, thereby resulting in a distance 76 that is approximately 750 microns, which is a multiple of an illustrative fiber to fiber distance 74 of 250 microns. The approximate distance of 10 microns between adjacent support members is by design so that when two mating support members are placed about a multi-fiber ribbon, the fiber will be under compression. This ensures that fibers with nominal variances in their outside diameters are precisely aligned between mating V-grooves. The controlling V-groove is preferably controlled by an applicable interconnection interface standard. For purposes of this disclosure, the center of a V-groove is the center of an optical fiber held in the V-groove. Thus, greater flexibility with regard to whether the interface planes of a stackable ferrule are parallel or perpendicular to the interfaces of a connecting ferrule.

Thus, by flipping the face-down side of each successive inner support member 14 added to a ferrule stack, the alignment pin holes 20 formed by the alignment pin grooves are positioned at alternating interfaces 75, also referred to as rows of optical fibers, as illustrated in FIGS. 1 and 3. In order to adequately align and secure the ferrule 10 from moving with respect to another ferrule to which it is being optically coupled, there should be at least two alignment pins. While the present invention does not necessarily provide for two alignment holes on every row of optical fibers, it does provide a more than adequate precision and rigidity for most applications, while permitting the overall thickness of the stack of ferrules to be reduced relative to conventional designs.

Accordingly, the ferrule 10 may terminate any number of multi-fiber ribbons by utilizing two outer support members 12 and an appropriate number of inner support members 14. As only the two structural components are necessary, the overall costs of a stackable multi-fiber ferrule in accordance with the present invention can be less than that of comparable stackable ferrules that require more than two components. This is, at least in part, because the support members can be fabricated using plastic injection molding techniques with only two molds: one for the outer support member 12 and one for the inner support member 14. This further increases the precision of the V-grooves because adjacent parts will often be formed from the same mold.

In particular, the support members 12, 14 are preferably fabricated using the techniques described in U.S. Pat. Nos. 5,388,174; 5,620,634 and 5,603,870, the disclosures of which are incorporated here by reference as if set forth in full. This process has been proven to consistently and reliably produce features with accuracy on the order of 1 $\mu$m or better. Generally, this process is as follows. Initially, a monocrystalline body, such as a silicon chip, is anisotropically etched using conventional masking and etching techniques to produce V-grooves. For example, either KOH/water or EDP/water solutions may be used as an etchant. The etch rate of the silicon may be several orders of magnitude greater than that of the mask layer such that the unmasked portions are etched away when exposed to the etchant solution, thereby defining the V-grooves along the {111} crystal planes of the silicon. By precisely controlling the mask pattern and the etching process, precise V-grooves of predetermined spacing, widths, and depths may be fabricated in the silicon wafer. It is noted that the V-grooves do not have to be exactly V-shaped. For example, since the optical fibers and alignment pins are essentially round in cross-section, the bottom of the V may be truncated in the same fashion as the alignment pin grooves 40, 60. If truncated, the grooves 40, 60 should be deep enough to provide adequate clearance for an alignment pin. Past that depth, the bottom of the groove is essentially non-functional. However, the depth of the groove may be limited by the necessary structural strength required of the support member, and in particular, the portion of the support member defining the alignment pin groove.

To allow for shrinkage of the plastic during the subsequent molding process, the features on the silicon chip, such as the V-grooves and their spacing, should be made somewhat larger than is finally intended for the final support member. A thin metal layer is then electro-formed over the V-grooves; thereafter, the silicon body is removed or destroyed, as by etching it in, for example, a mixture of HF, $HNO_3$ and water, or KOH and water (or other known etchants of silicon) suitable for use herein. In the preferred embodiment, the metal layer is formed by electroforming nickel over the silicon wafer. Nickel is preferred because it can be conveniently electro-formed with reasonable hardness (e.g., ~50 Rockwell). The electro-formed metal layer forms an inverse replica of the silicon wafer chip which is machined for used as an insert in an injection mold for defining the V-grooves, as well as other features, of the support members 12, 14.

Experiments may then conducted with the injection mold to optimize molding conditions. This involves selection of the most suitable molding compound, molding parameters that produce a smooth surface morphology, and most importantly the degree of mold shrinkage. Such experiments help determine the operation parameters for the optimal output. Preferred material for forming the support members is polyphenylene sulfide (PPS), which has a shrinkage of ~0.4% below the dimensions of the original silicon master.

Consequently, the dimensions of the silicon master should be ~0.4% greater than the final desired dimensions. For bonding the support members 12, 14 together, any of various optical adhesives can be used, such as Epo-Tek 353ND, which is commercially available from Epoxy Technologies, Inc., Billerica, Mass.

When the multi-fiber ferrule terminates five optical fibers per linear array, as in the illustrated embodiment, it is preferred that the central fiber be positioned at the center of the laterally spaced alignment pin grooves. The remaining four fibers are symmetrically placed on either side of the central fiber, so that the five fibers are equally spaced from adjacent fibers, thereby fitting all the fibers within a space of approximately one millimeter. The remainder of the 4.6 mm provided in the LC footprint is utilized for accommodating the alignment pin grooves and the structural requirements of the ferrule. For purposes of making a one-fiber connection, then the central fiber may be utilized. If a two-fiber connection is desired, then the two adjacent fibers on either side of the central fiber or the outer two fibers may be utilized as respective pairs. A three-fiber connection may comprise the central fiber and the two outer fibers, or alternatively, the central fiber and the two adjacent fibers on either side of the central fiber. A four-fiber connection may comprise the outer two fibers on either side of the central fiber. Lastly, a five-fiber connection would utilize all five fibers.

Multi-fiber ferrules such as the ones described above are the subject matter of co-pending patent application Ser. No. 09/262,112, entitled "Stackable Multi-Fiber Ferrule Assembly Methods And Tools," and application Ser. No. 09/262,107, entitled "Stackable Multi-Fiber Ferrules Having Improved Interconnection Density," both filed Mar. 4, 1999, the disclosures of which are incorporated by reference as if set forth in full.

Multi-Fiber Connectors

Figure 4A:
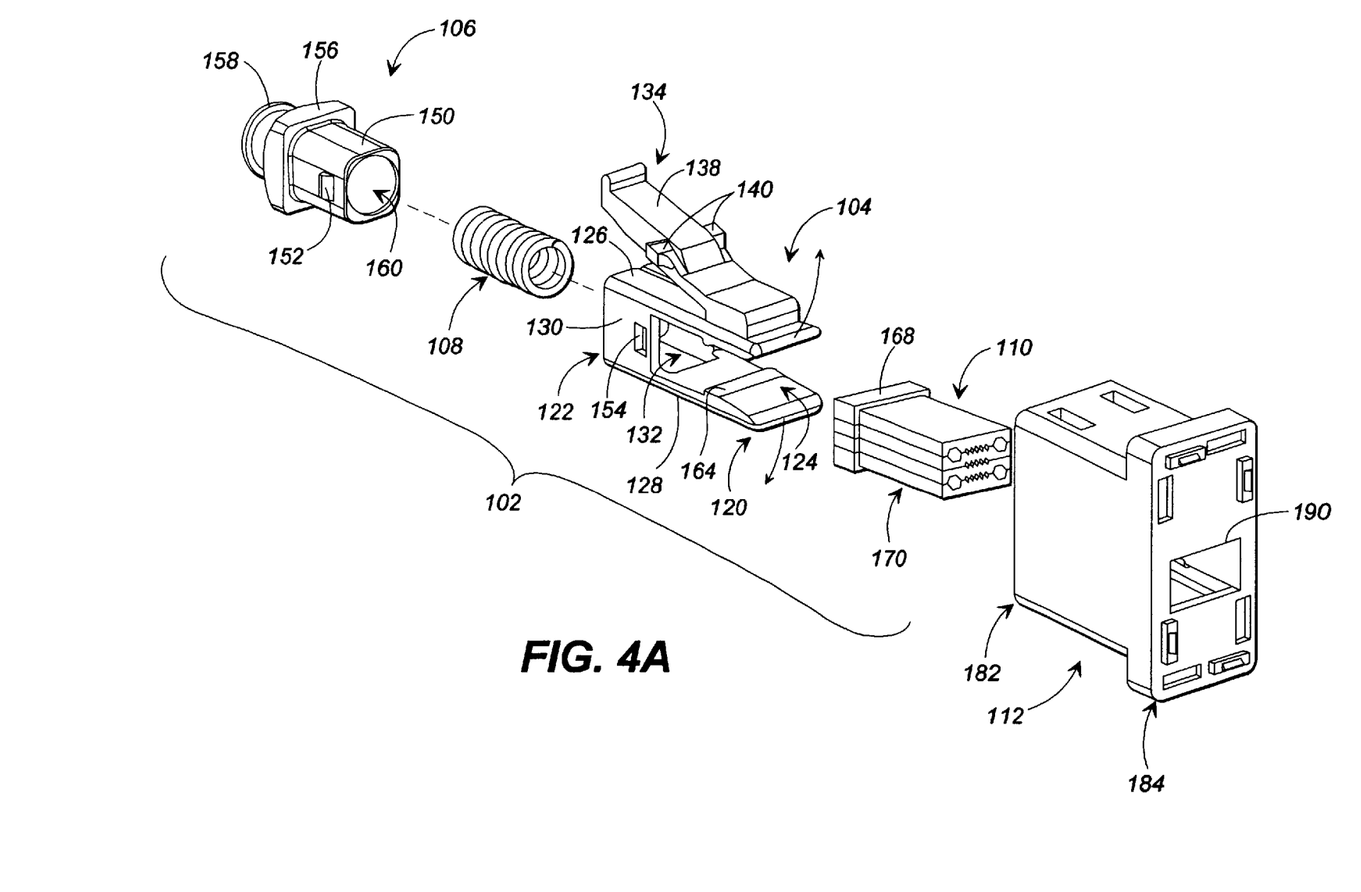
FIGS. 4A and 4B are exploded perspective view of the front and rear, respectively, of a small form factor, multi-fiber connector in accordance with one embodiment of the present invention.
Figure 4B:
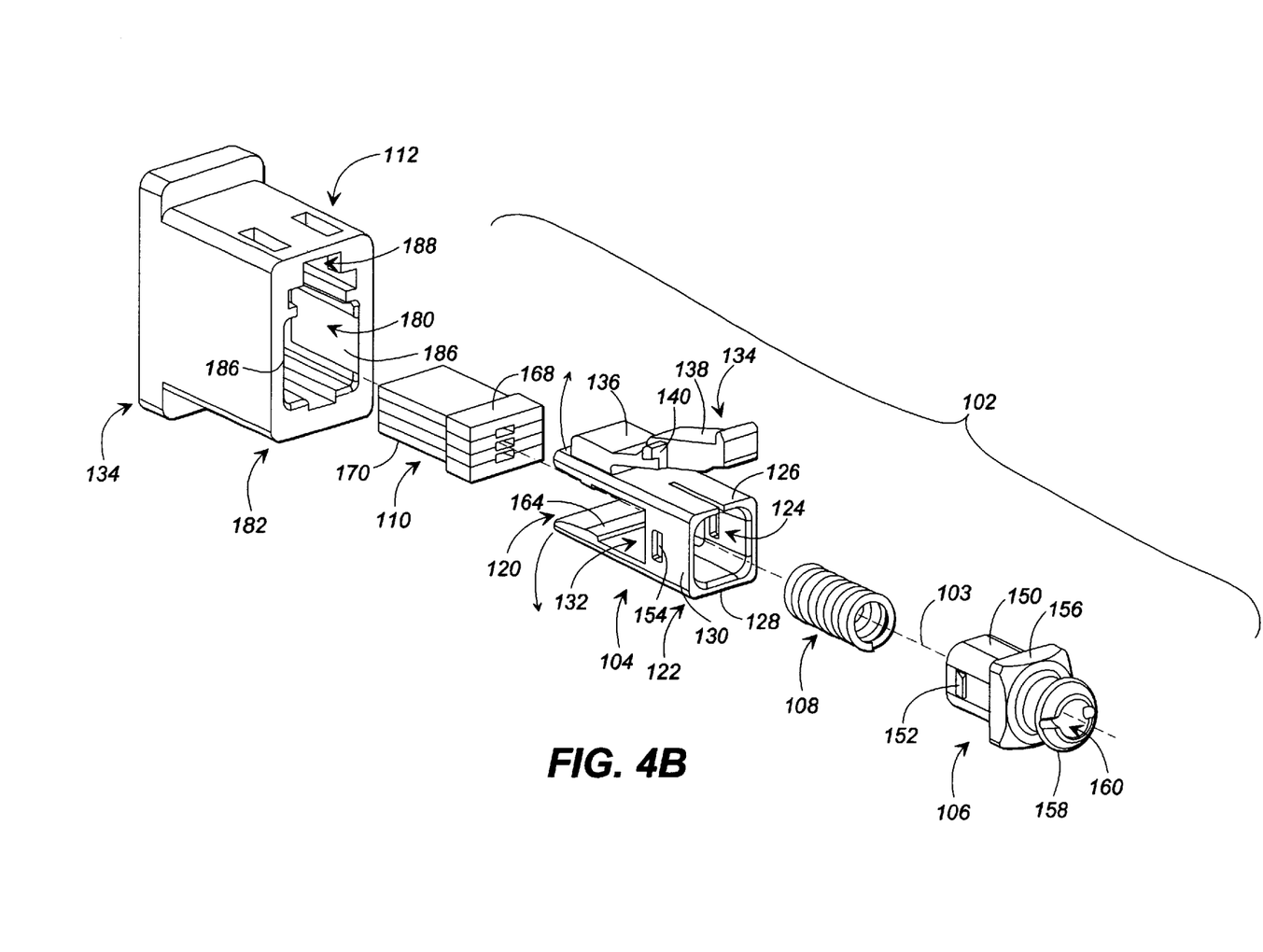

With reference to FIGS. 4A and 4B, a small form factor, multi-fiber connector 102 in accordance with the present invention is illustrated in an exploded view along the central axis 103. The multi-fiber connector 102 includes an elongated single-ferrule housing 104, an end cap 106, a spring member 108, and a multi-fiber ferrule 110. As illustrated, the assembled multi-fiber connector 102 may be axially inserted into an adapter 112 in order to couple the connector 102 to a passive or active device or connector, as discussed in greater detail below.

The elongated housing 104 includes a front end 120 and a rear end 122. An internal passageway 124 interconnects the front end 120 and the rear end 122. The housing further comprises a top side 126, a bottom side 128, and a pair of opposed lateral sides 130, each lateral side 130 defining a slot 132. Accordingly, the housing 104 has an essentially square cross-section with the dimensions of a LC connector, that is, approximately 5 mm from side to side. The general style of the housing 104 is that of the well known RJ45 housing which contributes to the ease and familiarity of use of the connector 102.

The housing 104 is preferably of unitary construction, composed of a resilient polymeric material, such as polyetherimide, so as to be light weight and durable. The housing may be fabricated using any number of suitable methods, but is preferably molded using well known molding techniques. Consequently, the housing may be relatively inexpensive to fabricate.

A spring latch 134 extends outwardly from the top side 126 of the housing 104. The spring latch 134 is a relatively simple and well known device that can be constructed in a number of different ways. Preferably, the spring latch includes a relatively wide base portion 136 which is generally unitarily formed with the top side 126 of the housing 104. Extending from the base portion 136 is a cantilever member 138 which includes a pair of laterally extending shoulders 140. The cantilever 138 is preferably made of material that can be deformed somewhat by the application of force, but then return to its original shape after the force is removed.

Figure 5A:
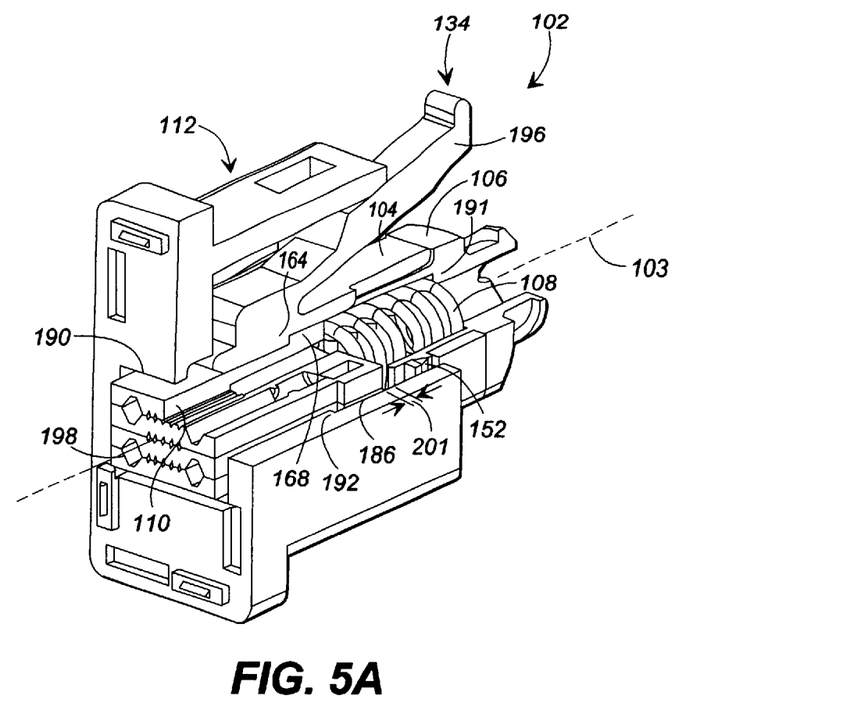
FIGS. 5A and 5B are front and rear perspective views of a multi-fiber connector housing assembly inserted into an adapter, respectively. The adapter and connector housing are shown in partial cross-section.
Figure 5B:
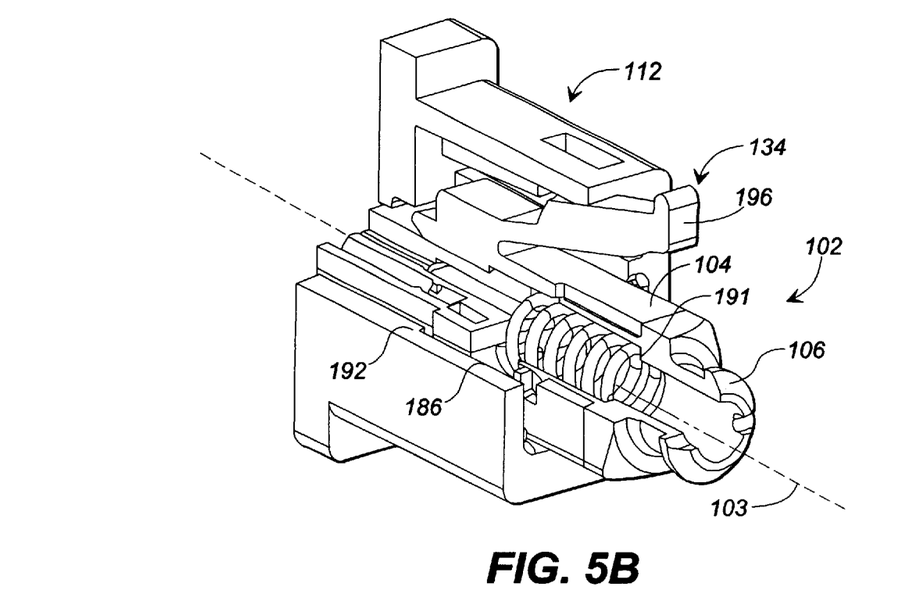

A partially sloped ridge 164 is provided on the inside surfaces of the top side 126 and bottom side 128 at the front end 120 of the housing 104. Accordingly, when the multi-fiber ferrule 110 is being placed within the housing 104, the lip 168 of the multi-fiber ferrule 110 deflects the front portions of the top side 126 and bottom side 128 in a direction perpendicular to the axis 103 of the connector 102, as shown by the arrows. Once completely inserted into the housing 104, and the lip 168 passes the partially sloped ridges 164, the front portions of the top side 126 and bottom side 128 return to their original position. Yet further, the ridges 164 engage the lip 168 so as to limit the outward movement of the multi-fiber ferrule 110 along the axis 103. Once the ferrule is positioned within the housing 104, the lateral sides of the lip 168 may at least partially extend through the slots 132 in the side walls 130. However, the design of the side walls is not critical to the present invention, and if desired, the side walls may not include a slot, but to be substantially continuous from the front 120 and the rear 122. In this case, it may be preferable that the lip 168 of the multi-fiber ferrule 110 not extend laterally past the side edges of the front portion 170. Once the multi-fiber ferrule 110 has been received in the housing 104, it is desirable that the ferrule 110 have a nominal amount of axial movement. Accordingly, when not coupled to another optical device or connector, the multi-fiber ferrule 110 is axially loaded so that lip 168 rests against ridge 164 (as best shown in FIGS. 5A and 5B) by a loading mechanism, such as the spring member 108.

The end cap 106 is sized and configured to be received in the passageway 124 at the rear end 122 of the housing 104. In particular, a substantially rectilinear portion 150 securely slides within the passageway 124 and is held in place by stops 152, which engage corresponding apertures 154 in the side walls 130 of the housing 104. A flange 156, having a larger cross-section than male portion 150, abuts the rear end 122 of the housing 104 when the end cap 106 is inserted into the housing 104. A tubular neck 158 extends axially along axis 103 and operates as a guide for the multi-fiber ribbon terminated by the multi-fiber ferrule 110 and extending through a cylindrical passageway 160 defined by the end cap 106. The portion of the cylindrical passageway 160 defined by the rectilinear portion 150 is sized and shaped to receive and hold the spring member 108. The spring 108 provides axial loading of the multi-fiber ferrule 110 for maintaining positive pressure during an optical connection, as discussed below.

As with the housing 104, the end cap 106 may be molded from a commodity thermoplastic in order to achieve a low-cost, lightweight connector. For example, a preferred material for use in fabricating the end cap 106 is polyetherimide. Further, the end cap 106 may be integrally formed with the housing 104, if desired.

The adapter 112 is a generally elongated structure of a unitary construction having a front end 182, a rear end 184, and an internal passage 180 that extends from the front end 182 to the rear 184. At the front end 182 of adapter 112, the passageway 180 is defined in a shape for receiving connector 102. In particular, the recesses 186 are sized to correspond to the dimensions of lip 168 so that the recesses 186 will receive and precisely guide the axial movement of the multi-fiber ferrule 110 within the adapter 112. In addition, a notch 188 receives and operates in conjunction with the spring latch 134 to selectively hold the connector 102 within the adapter 112, as is well known in the art. At the rear end 184 of the adapter 112, the passageway 180 is defined as an aperture 190 which is sized and shaped to receive the front end portion 170 of the multi-fiber ferrule 110. Accordingly, the aperture 190 may vary in size and shape depending upon the requirements of the particular multi-fiber ferrule 110. For instance, ferrules designed in accordance with different industry standards or that include a different number of fibers may require a differently sized or shaped aperture 190. As discussed above, the adapter 112 may be connected to (i.e., interfaced with) a passive connection device (e.g., another adapter receiving a second mating optical fiber connector) or an active system (e.g., an optical transceiver or surface emitting laser).

As with the housing 104 and the end cap 106, the adapter 112 may be molded from a commodity thermoplastic in order to achieve a low-cost, lightweight connector. For example, a preferred material for use in fabricating the adapter 112 is polyetherimide.

With references to FIGS. 5A and 5B, a partial cross-sectional view of the connector 102 in its assembled state and coupled to the adapter 112 is provided. As illustrated, the lip 168 is urged against the ridge 164 by spring member 108 which is biased against a step 191 within the passageway 160 of the end cap 106. Further, the recesses 186 receive the lateral portions of the lip 168 for assisting in the precise positioning of the multi-fiber ferrule 110 within the adapter 112. The recesses 168, however, include a step 192 against which the lateral portions of lip 168 which at least partially extend through the slots 132 may rest.

It will be understood by those of ordinary skill in the art that the shoulders 140 of the spring latch 134 are received in recesses within the adapter 112 for essentially locking the connector 102 in place within the adapter 112. In order to remove the connector 102 from adapter 112, user may downwardly depress the distal end 196 of cantilever member 138 so as to remove the shoulders 140 from their recesses, thereby allowing the axial movement of connector 102 out of adapter 112. This ease of use by which the connector 112 may be placed in or removed from adapter 112 while maintaining precise control over the positioning of multi-fiber ferrule 110 is an advantageous feature in that it is quick, user friendly, it provides a requisite precision necessary than optical interconnect system.

With particular reference to FIG. 5A, the aperture 190 receives and precisely positions the front end face 198 of the multi-fiber ferrule 110. The end face 198 may be mated to a second ferrule to connect two or more optical fibers terminated by the respective ferrules. In order to maintain the precise alignment of the respective fibers, the end faces of the respective ferrules are mated together under a positive pressure so as to maintain the contiguous positioning of the ferrules. This positive pressure, as mentioned before, is provided by the spring member 108. While the spring member 108 urges the multi-fiber ferrule 110 against ridge 164 and step 192, the multi-fiber ferrule is provided with a nominal amount of axial movement 201 for accommodating a nominal amount of displacement when the mating ferrules are pushed against one another.

Figures 6A, 6B, 6C, 6D:
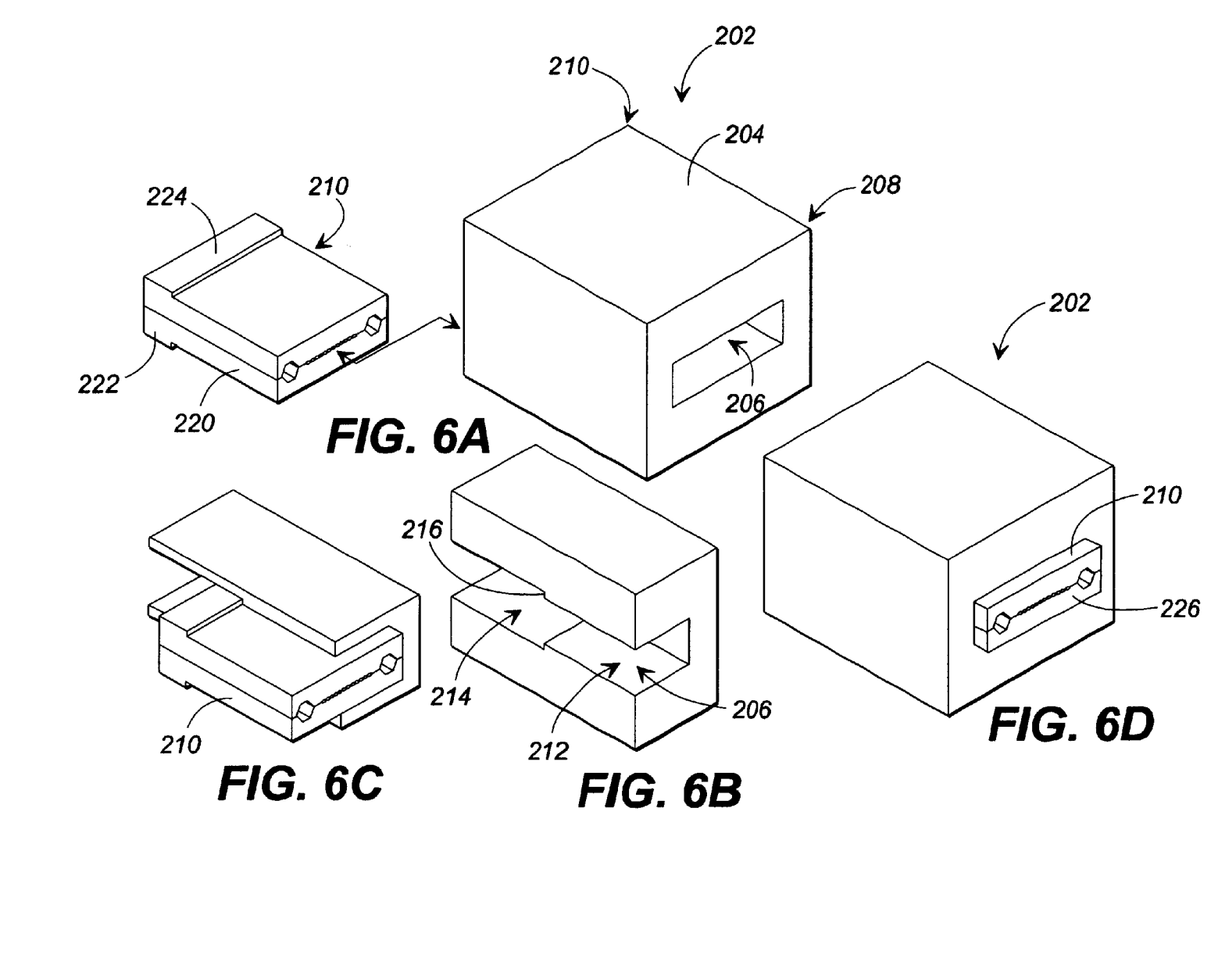

With reference to FIGS. 6A–6D, an alternative embodiment of the present invention is provided. With reference to FIG. 6A, a multi-fiber connector 202 in accordance with the present invention comprises a substantially rectilinear housing 204 of unitary construction defining a passageway 206 extending from a front end 208 to a rear end 210. As illustrated in a cross-sectional view of FIG. 6B, the internal passageway 206 comprises a smaller portion 212 adjacent to the front end 208 and a larger portion 214 adjacent to the rear end 210, wherein the smaller portion 212 and the larger portion 214 interface at a step 216. When a multi-fiber ferrule 210 is placed within the housing 204, the front end portion 220 of the ferrule 210 is received within a smaller portion 212 and the rear end portion 222, including a lip 224, of the ferrule 210 is received within a larger portion 214, as illustrated in FIG. 6C. The positioning of step 216 is predetermined so that the end face 226 of the multi-fiber ferrule 210 extends external to passageway 206 as illustrated in FIG. 6D. It is preferred that the housing 204 be molded from a commodity thermoplastic such as resilient polymeric material (e.g., polyetherimide) in order to achieve a low-cost, lightweight housing. The thickness of the walls defining the interior passageway 206 is not critical other than the necessity to provide the necessary structural support required of the application for which connector 202 is utilized.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A multi-fiber optical connector, comprising:
   a stackable multi-fiber ferrule that terminates a plurality of optical fibers;
   a single-ferrule housing having a first end, a second end, and an axial passageway extending from the first end to the second end, wherein the housing receives the multi-fiber ferrule in the first end thereof; and
   a spring member disposed in the passageway and interacting with the multi-fiber ferrule to axially urge the multi-fiber ferrule outwardly.

2. The connector of claim 1, wherein said housing includes an end cap coupled to the second end thereof, and interacting with the spring member opposite the multi-fiber ferrule.

3. The connector of claim 2, wherein the multi-fiber ferrule terminates a single linear array of optical fibers.

4. The connector of claim 2, wherein the multi-fiber ferrule terminates stacked arrays of optical fibers.

5. The connector of claim 4, wherein the stacked arrays of optical fibers are configured so that the lateral spacing between adjacent optical fibers is an integer multiple of the vertical spacing between corresponding optical fibers.

6. The connector of claim 2, wherein the multi-fiber ferrule includes optical fibers spacing of approximately 250 microns.

7. The connector of claim 2, wherein the housing defines opposing slots, and wherein the multi-fiber ferrule at least partially extends through the slots.

8. The connector of claim 1, further comprising a spring latch extending from the housing.

9. The connector of claim 1, further comprising an adapter having a front end that receives the housing and a rear end that includes an aperture through which an end face of the multi-fiber ferrule protrudes.

10. The method for fabricating a multi-fiber optical connector, comprising:

providing an elongated single-ferrule housing having a first end, a second end, and an axial passageway extending from the first end to the second end;

placing a spring member in the axial passageway adjacent to the second end; and placing a stackable multi-fiber ferrule in the first end of the plug housing so that the spring member axially urges the multi-fiber ferrule outwardly from the housing.

11. The method of claim 10, wherein the step of providing the elongated housing includes the step of providing an elongated housing with a spring latch extending therefrom.

12. The method of claim 10, wherein the step of providing the elongated housing includes the step of coupling an end cap to the second end of the elongated housing.

13. The method of claim 10, further comprising the step of providing an adapter having a first end that receives the elongated housing and a second end that includes an aperture through which an end face of the multi-fiber ferrule protrudes.

14. The method of claim 10, wherein the step of providing the elongated housing includes the step of providing an elongated housing that defines opposing lateral slots, and wherein the step of placing the multi-fiber ferrule includes the step of placing the multi-fiber ferrule in the first end of the elongated housing so that the multi-fiber ferrule at least partially extends through the slots.

15. A small form factor multi-fiber optical connector for high density applications, comprising an elongated single-ferrule housing having a first end, a second end, and axial passageway there through;

a stackable multi-fiber ferrule received in the first end of the elongated single-ferrule housing;

an end cap coupled to the second end of the elongated single-ferrule housing; and a loading mechanism disposed within the passageway between the multi-fiber ferrule and the end cap for axially urging the multi-fiber ferrule outwardly; and a latch mechanism coupled to the elongated single-ferrule housing.

16. The connector of claim 15, wherein the elongated housing defines slots in opposing sides thereof, wherein the multi-fiber ferrule extends at least partially through the slots.

17. The connector of claim 15, wherein the multi-fiber ferrule terminates stacked arrays of optical fibers.

18. The connector of claim 17, wherein the stacked arrays of optical fibers are configured so that the lateral spacing between adjacent optical fibers is an integer multiple of the vertical spacing between corresponding optical fibers.

19. The connector of claim 15, wherein the multi-fiber ferrule includes optical fibers spacing of approximately 250 microns.

20. The connector of claim 15, further comprising an adapter having a first end that receives the elongated housing and a second end that includes an aperture through which an end face of the multi-fiber ferrule protrudes.

21. A multi-fiber optical connector, comprising:

a housing having a first end, a second end, and an axial passageway extending from the first end to the second end;

a stackable multi-fiber ferrule received in the first end of the housing;

an end cap received in the second end of the housing, the end cap having a cylindrical passageway for receiving at least a portion of the spring member disposed in the axial passageway of the housing; and a spring member interacting with the multi-fiber ferrule to axially urge the multi-fiber ferrule outward.

22. A multi-fiber optical connector, comprising:

a housing having a first end, a second end, a top side, a bottom side, an axial passageway extending from the first end to the second end and at least one ridge on an inside surface of the housing defining the axial passageway;

a stackable multi-fiber ferrule having a front end, a rear end and a lip disposed adjacent the front end, wherein the ferrule is received in the first end of the housing and the lip is engaged by the ridge; and a spring member disposed in the passageway and interacting with the multi-fiber ferrule to axially urge the lip against the ridge.

* * * * *

UNITED STATES PATENT AND TRADEMARK OFFICE
CERTIFICATE OF CORRECTION

PATENT NO. : 6,259,856 B1
DATED : July 10, 2001
INVENTOR(S) : Shahid

It is certified that error appears in the above-identified patent and that said Letters Patent is hereby corrected as shown below:

<u>Title page,</u>
Item [56], References Cited, U.S. PATENT DOCUMENTS, insert:
-- 5,689,598   11/1997   Dean, Jr. et al.   385/59 --.

Signed and Sealed this

Twenty-fifth Day of June, 2002

*Attest:*

JAMES E. ROGAN
*Attesting Officer*   *Director of the United States Patent and Trademark Office*